J. J. CAIN.
METHOD FOR MAKING HEADERS FOR TUBULAR BOILERS.
APPLICATION FILED JAN. 24, 1919.
1,420,241. Patented June 20, 1922.
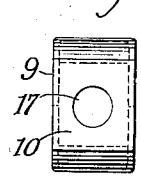
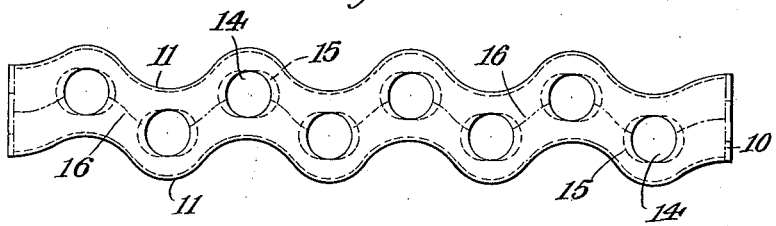
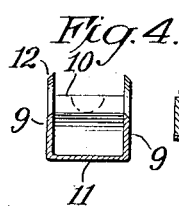
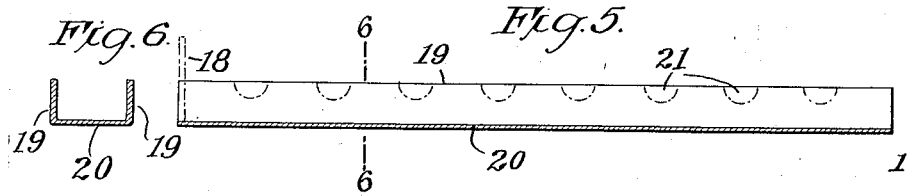
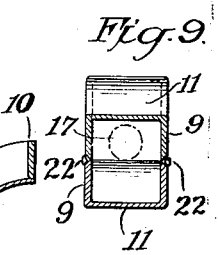
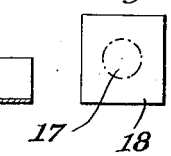
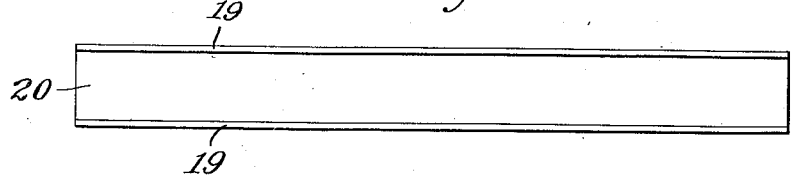
Inventor
John J. Cain.
By his Attorney. Albert Shedlock.

UNITED STATES PATENT OFFICE.

JOHN J. CAIN, OF BAYONNE, NEW JERSEY.

METHOD FOR MAKING HEADERS FOR TUBULAR BOILERS.

1,420,241.  Specification of Letters Patent.  Patented June 20, 1922.

Application filed January 24, 1919. Serial No. 272,822.

*To all whom it may concern:*

Be it known that I, JOHN J. CAIN, a citizen of the United States, residing at Bayonne, county of Hudson, State of New Jersey, have invented a new and useful Method for Making Headers for Tubular Boilers, of which the following is a specification.

The subject matter of this application is a division in part of the application for Letters Patent filed by me April 30, 1918, under Serial No. 231,663, and relates to the manufacture of headers for tubular boilers. It has for its object simplicity of construction of such headers and dependability of effectively resisting all internal pressures they are subjected to.

Another object is to minimize the welding operation when headers are composed of two or more pieces, which is generally the case when they are made of sheet metal, the previous practice being to connect the pieces together at the corners longitudinally of the headers and at the ends. In practising the method of this invention two similar trough like vessels, made of cast or wrought sheet metal, are placed together with the edges of their sides adjacent, which are securely connected by being welded together; when the ends are made integral with the trough their edges are also welded together. The line of welding is intermediate the front and back walls of the headers, and as said front and back walls have tube holes and hand holes formed in them it is proposed to weld the edges only at the spaces between the holes, thus saving about one-half of the welding expense.

The two parts of the headers are open shallow troughs, their depths preferably being equal to one-half the width of the completed header. This feature greatly facilitates their manufacture and insures homogeneity throughout the metal as no core is required when they are made of cast metal, as steel; cores being always a cause of uncertainty as to the quality and condition of the article cast, many defects not being apparent until the headers are fully completed and subjected to pressure tests.

The side walls and ends of the troughs are made thicker than the bottoms to provide necessary strength and ample metal for the welding operation and for such tooling as is necessary to form the tube holes and hand holes. The trough like vessels, made of sheet metal, used in making the headers may be produced by the method described in the application for Letters Patent filed by me April 30, 1918, under Serial No. 231,664.

In the accompanying drawings:

Fig. 1, represents a header for tubular boilers made under the method of this invention.

Fig. 2, is an end view of the same.

Fig. 3, is a longitudinal section of one of the troughs of which the header is composed.

Fig. 4, is a transverse section on the line 4, 4, Fig. 3.

Fig. 5, represents a plain trough or channel, two of which when connected together constitute the main part of a plain or straight line header.

Fig. 6, is a section on line 6, 6, Fig. 5.

Fig. 7, is a plan view of Fig. 5.

Fig. 8, represents one of the end pieces adapted to be welded in the ends of the header when the troughs are made without ends, and Fig. 9, is a transverse section of opposed troughs, as shown in Fig. 3, with the edges of their sides adjacent and welded together.

To make the header shown at Figs. 1 and 2, which in tubular boilers are generally corrugated, two similar troughs, represented in Figs. 3 and 4, whose side walls 9, and end walls 10, are thicker than their bottoms 11, are arranged with the free edges of their walls adjacent, which are then secured together by a suitable welding process, electrical or by acetylene, see Fig. 9, thus forming an elongated box or chamber, as shown in Fig. 1.

The troughs, Fig. 3, have the bottoms 11, and the edges of the side walls 9, correspondingly corrugated. The edges of side walls may be chamfered as at 12, to facilitate the welding operation. Fig. 3, may be taken to represent either a sheet metal or cast metal trough, which being quite shallow is easily formed. If cast it may be produced without using cores, whereby both the insides and outsides of the casting will be clean and smooth. The thickness of the walls 9 and 10 may be increased to any desired extent beyond that of the bottom. If made of sheet metal the walls may be thickened during the shaping operation, as described in my before mentioned application No. 231,664.

Recesses 13, may be formed in the edges of the walls, arranged to align, to constitute nuclei for the formation of the tube holes and hand holes, 14 and 15, in the front and back walls respectively of the completed header. The only welding to be done on median lines longitudinally of the front and back walls is at the spaces between the holes, if said holes are partly preliminarily formed, or at the inclined parts of the central sinuous joint if the troughs are made with plain edges and the holes cut or tooled after the welding operation, as indicated by the dotted lines 16, Fig. 1. The edges of the end walls 10 are also welded together and will generally be provided with pipe connecting holes 17. In the transverse section Fig. 9, the median lines of welding at the edges of the front and back walls are indicated at 22, 22.

The ends of the two trough like vessels, used in making the headers, may in some cases, be omitted, and then be applied in the form of plates 18, Fig. 8, and welded in place at the time or after the two parts are welded together.

Figs. 5 and 7 represent a plain or straight line trough without ends, in the manufacture of which, when sheet or wrought metal is used, any wrought metal working process may be practiced, as for instance by rolling process. It is shown as channel iron, the side walls 19, 19, of which are thicker than the bottom 20. Two such pieces placed with the edges of the walls 19 together and welded with plates 18 welded in the ends will constitute a rectangular header or closed chamber. Recesses 21 may be formed in the edges during the process of manufacture at the places where the tube and hand holes will be in the completed article. Such channel pieces may also be corrugated as indicated at Fig. 3, and this may be done by suitable forming rolls during or after the channel forming operation. These recesses may by suitably formed rolls be made during the channel forming operation.

The end connecting pipe holes 17, may be made in the plates 18, before they are applied to and secured in the ends of the header, see Fig. 6, in which an end plate 18, is shown located at an end of a channel piece.

It is obvious that the method of this invention may be exercised in the manufacture of closed chambers other than headers for tubular boilers, their sides being strengthened where necessary by using the minimum amount of metal in their formation.

I claim:

1. The method of making headers for tubular boilers which consists in forming trough-like vessels with the side walls thicker than the bottoms, arranging them in pairs with the edges of the side walls adjacent, and then welding said edges together, whereby the welding lines of the completed header are located in the thickened side walls.

2. The method of making headers for tubular boilers, which consists in forming trough like vessels, each having a bottom and sides, with recesses formed in the edges of the sides, then arranging them in pairs with the edges of the walls adjacent and then welding the edges between the recesses together, the lines of welding being median lines between the front and back walls of the completed header and the opposed recesses forming openings in the completed header.

3. The method of making headers for tubular boilers, which consists in forming trough like vessels, each having a bottom and sides and end pieces, with recesses formed in the edges of the sides, then arranging them in pairs with the edges of the sides and ends adjacent and then welding the side edges between the recesses together and also welding the edges of the end pieces to complete the same.

4. The method of making headers for tubular boilers, which consists in forming channel trough like vessels with the sides thicker than the bottoms, the edges of the sides and the bottom being similarly corrugated, then arranging them in pairs with the corrugated edges of the sides adjacent and then welding the angularly arranged portions of the corrugated side edges together, the lines of welding being intermediate the front and back walls of the completed header, whereby the welding lines in the completed header are located in the thickened walls.

Signed at New York, county and State of New York, this 20th day of January, 1919.

JOHN J. CAIN.

In the presence of—
JAMES A. HUDSON,
JOHN J. HAYDEN.